United States Patent [19]

Zimmerman

[11] Patent Number: 5,000,268
[45] Date of Patent: Mar. 19, 1991

[54] LIFTING ASSEMBLY FOR AGRICULTURAL IMPLEMENTS

[76] Inventor: Robert Zimmerman, Box 6, Almira, Wash. 99103

[21] Appl. No.: 474,349

[22] Filed: Feb. 2, 1990

[51] Int. Cl.⁵ .............................................. A01B 63/16
[52] U.S. Cl. .................... 172/240; 172/248; 172/310; 172/421; 280/43.17
[58] Field of Search ............... 172/240, 245, 248, 310, 172/311, 421, 423–428, 466, 481, 491, 501, 502, 504, 668, 677, 679, 680, 776; 280/43.17, 43.19, 43.23, 413, 414.5, 416.1; 111/52–55, 926

[56] References Cited

U.S. PATENT DOCUMENTS

| | | | |
|---|---|---|---|
| 544,284 | 8/1895 | Casaday | 280/43.19 |
| 2,635,517 | 4/1953 | Silver et al. | 172/668 X |
| 3,207,233 | 9/1965 | Shumaker | 280/43.23 X |
| 3,913,683 | 10/1975 | Olsson et al. | 111/54 X |
| 4,083,411 | 4/1978 | van der Lely | 172/248 X |
| 4,106,788 | 8/1978 | Bohnert | 280/43.23 |
| 4,117,892 | 10/1978 | Dietrich, Sr. et al. | 172/311 |
| 4,127,283 | 11/1978 | Baden | 172/248 |
| 4,157,735 | 6/1979 | Olsson et al. | 172/240 |
| 4,446,926 | 5/1984 | Hoaglen | 172/240 |
| 4,821,811 | 4/1989 | Swenson | 172/248 |

Primary Examiner—Randolph A. Reese
Assistant Examiner—Jeffrey L. Thompson
Attorney, Agent, or Firm—Wells, St. John & Roberts

[57] ABSTRACT

An auxiliary support for permitting longitudinal travel of transversely elongated agricultural implements comprises a pivoted lifting frame adapted to extend outwardly and downwardly to elevationally raise the implement framework at one side. The outer end of the lifting frame is provided with a wheel aligned in the desired longitudinal direction of travel. An adjustable and removable saddle has an extension that overlies the implement frame to permit interposition of a conventional jack to raise and lower the implement framework as required. The elevated implement framework is held in a travel position by chains extending between the outer end of the lifting frame and brackets attached to the implement framework. A foldable hitch frame can be provided at one side of the implement framework to facilitate towing of the implement in a direction perpendicular to its normal direction of field movement.

17 Claims, 4 Drawing Sheets

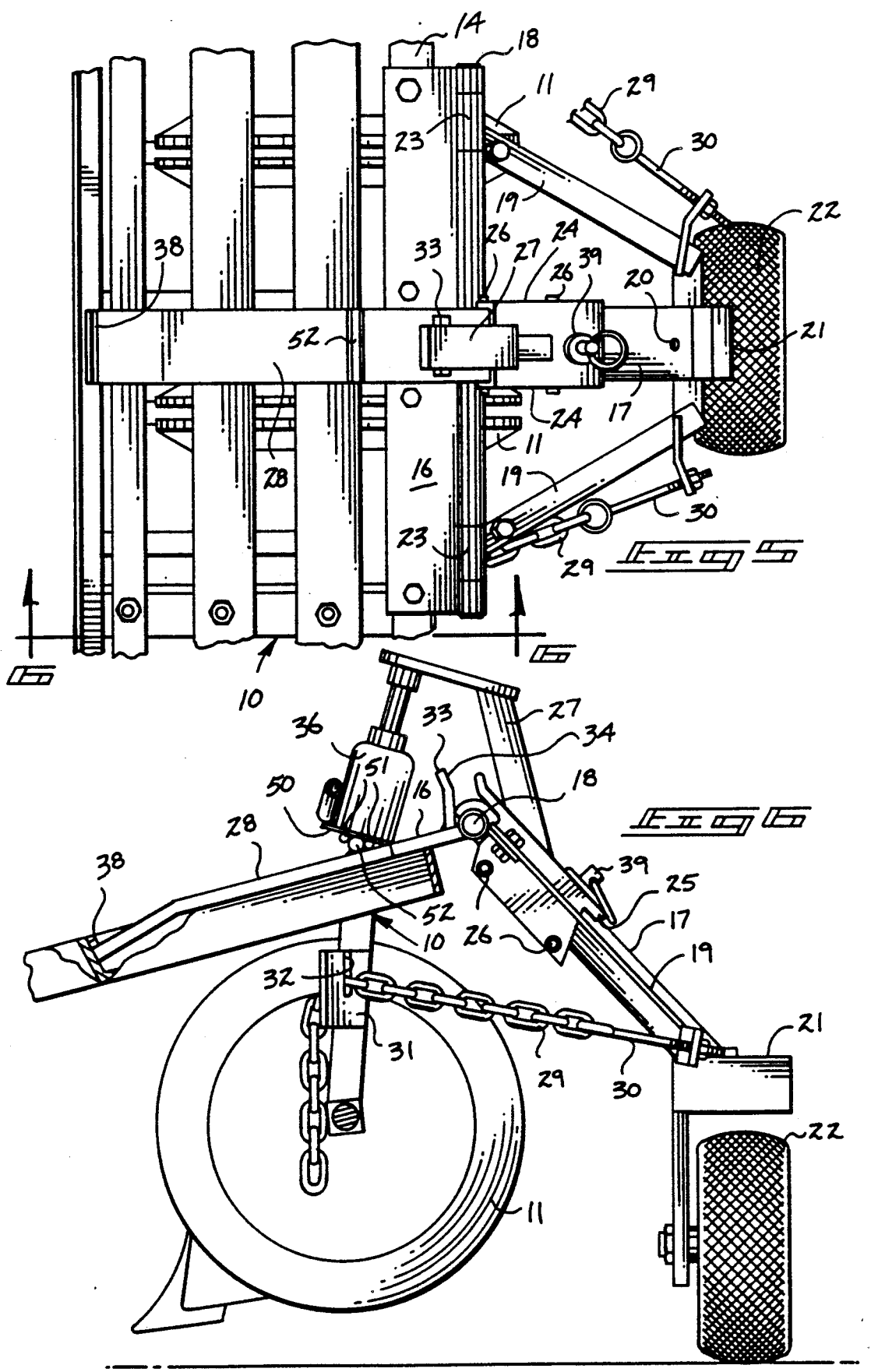

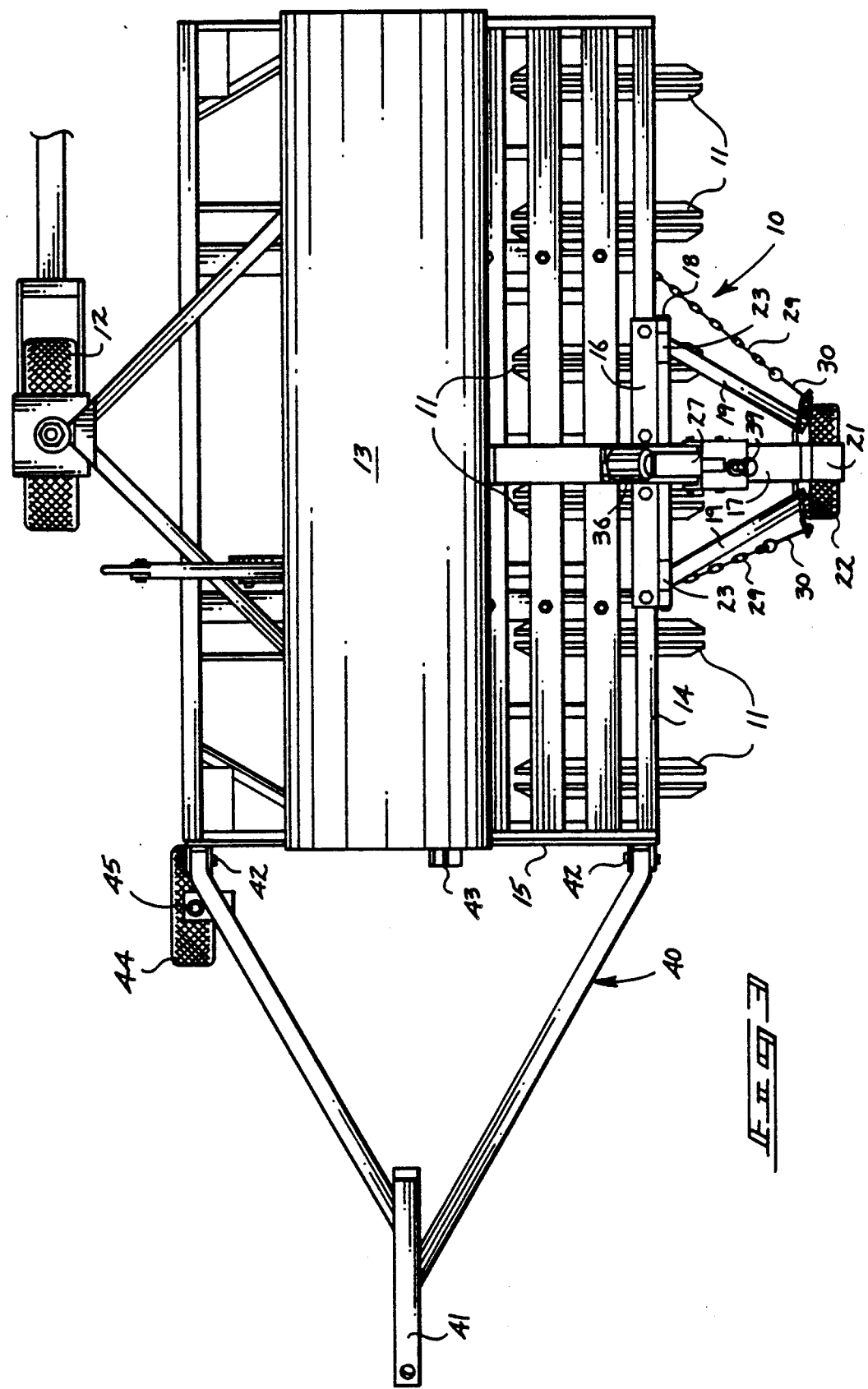

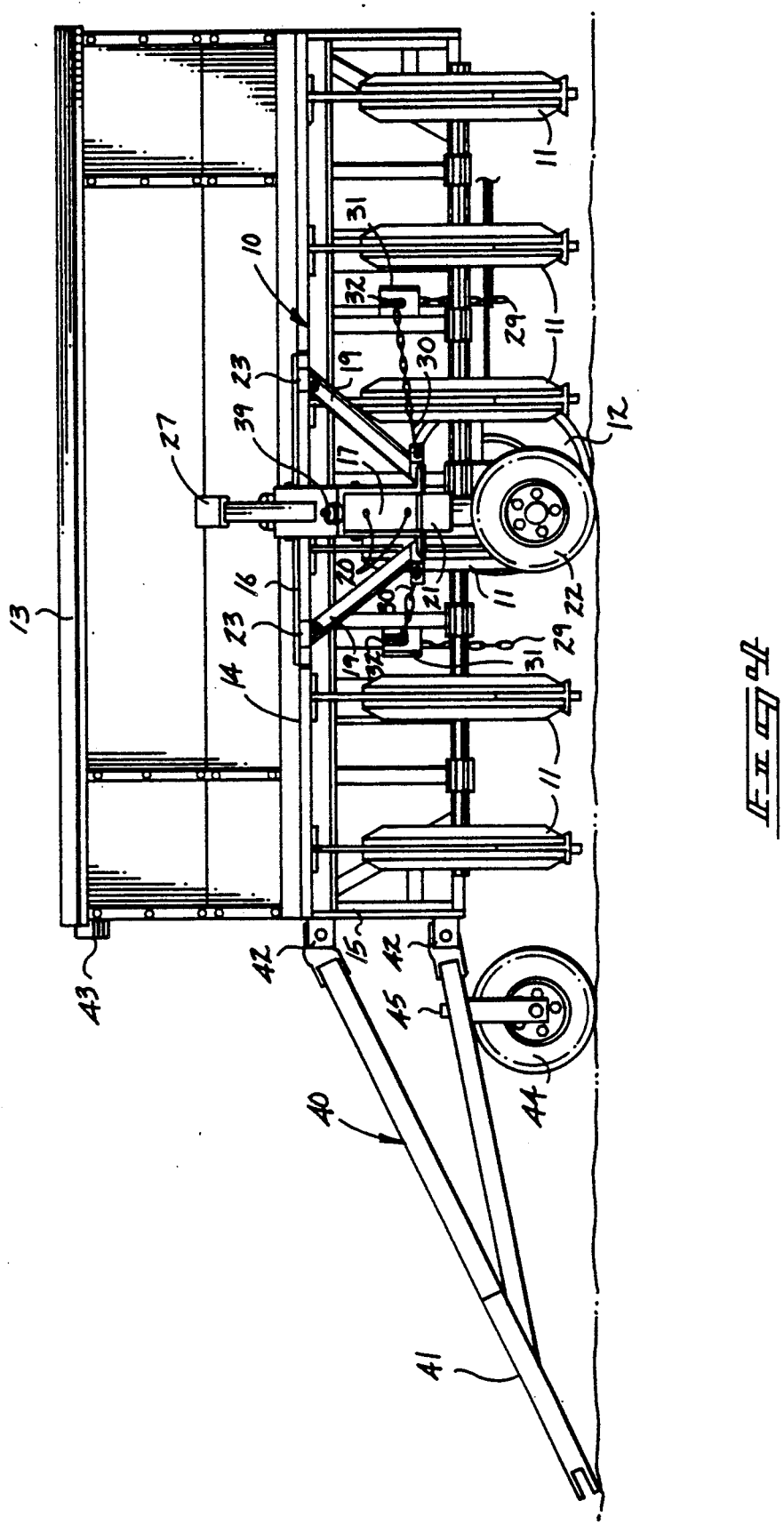

LIFTING ASSEMBLY FOR AGRICULTURAL IMPLEMENTS

TECHNICAL FIELD

This disclosure pertains to equipment for facilitating road transportation of normally transverse ground-engaging agricultural implements, such as seed drills. It permits longitudinal movement of the implements without modifying their normal field usage.

BACKGROUND OF THE INVENTION

Many agricultural implements are normally used in transverse field positions. In many cases the ground-engaging tools on the implement also serve to support all of part of its weight. Some implements are provided with elevationally adjustable wheel supports for lifting the tools from the ground and facilitating road travel in either the transverse or longitudinal orientation. However, such equipment has typically required manual dedicated jacks or hydraulic lifting cylinders for operation of the wheel support structures. This substantially adds to both the cost of the equipment and the maintenance necessary to keep such auxiliary operating systems operational.

The present invention arose from an effort to produce an economical and effective device for lifting such transverse implements, such as grain drills, and supporting them for endwise road travel, either as individual units, or as a string of interconnected units.

BRIEF DESCRIPTION OF THE DRAWINGS

The preferred embodiment of the invention is illustrated in the accompanying drawings, in which:

FIG. 3 is a top view of FIG. 2;

FIG. 4 is a rear view of FIG. 2;

FIG. 5 is an enlarged plan view of the support; and

FIG. 6 is a sectional view taken along line 6—6 in FIG. 5.

DETAILED DESCRIPTION OF THE PREFERRED EMBODIMENTS

Figure 1:
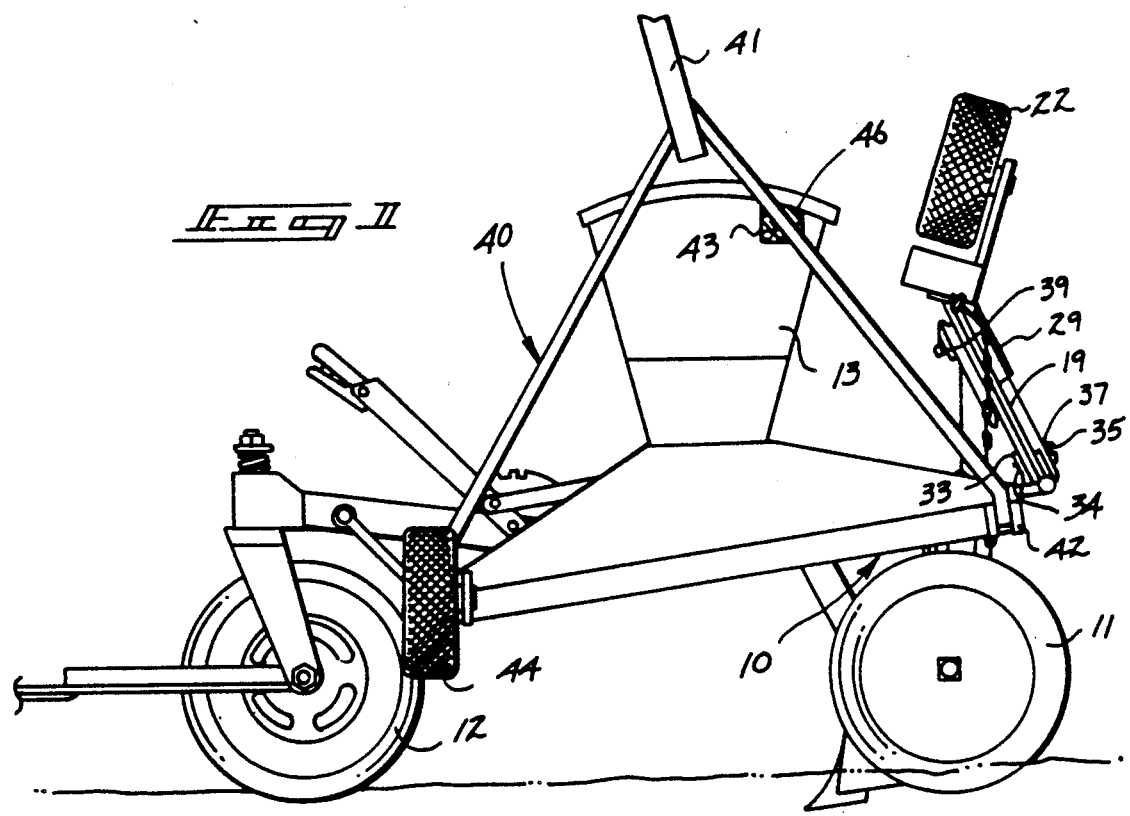
FIG. 1 is a side view of a grain drill equipped with the present invention, illustrated in its field position.

The following disclosure of the invention is submitted in furtherance with the constitutional purpose of the Patent Laws "to promote the progress of science and useful arts" (Article 1, Section 8).

The invention is described and illustrated in relation to a conventional grain drill of the type generally described in U.S. Pat. No. 3,319,590, which is incorporated by reference into the present disclosure. The invention is not limited to grain drills, but is applicable to any type of agricultural implement having an elongated transverse framework carrying a plurality of tools in ground-engaging positions as the implement moves across a field during its normal use.

Referring to FIG. 3, which shows a top view of the implement, it is elongated in a transverse direction extending from side to side. The terms "front" and "rear" as used in this description shall refer to the intended forward direction of movement of the implement during field use (toward the top of FIG. 3 and toward the left in FIG. 1).

The illustrated grain drill includes a rigid mobile framework 10 that carries a plurality of ground-engaging tools 11. In the case of a grain drill, such as that illustrated in the drawings, the tools 11 will comprise furrow openers, seed boots and press wheels that cooperate to open a furrow, place seed within it, and press the sides and bottom of the furrow to complete the required planting action.

The framework 10 also supports a seed box 13, which stores and delivers seed to the individual planting tools 11.

The details of the specific ground-engaging tools carried on the implement are not essential to an understanding of the present invention. Tools 11 are typically suspended from the implement framework 10 in a rigid manner so that the weight of framework 10 is applied to them. Conversely, by lifting framework 10, one can similarly raise the elevation of tools 11.

The illustrated framework 10 is provided with a pivotable front wheel 12 that rolls along the field surface forward of the ground-engaging tools 11. The wheel support frame carrying the front wheel 12 can be connected to a field hitch on a tractor or other powered vehicle (not shown) for pulling the implement individually or in a transverse group. It is usually freely pivotable about a vertical axis to facilitate turning of the pulled implement.

Framework 10, when viewed in plan (FIG. 3) includes a rear transverse frame member 14 and a side transverse frame member 15. These two frame members are utilized for mounting the auxiliary support and hitch of the present disclosure.

The present improvements pertain to equipment for lifting and facilitating longitudinal travel of the agricultural implement. These items can be fabricated as part of the implement or can be added to existing implements.

The accessory support for the implement framework is attached to the rear transverse frame member 14 by means of a complementary bracket 16. The bracket 16 is adapted to be fixed to the frame member 14 by a series of connecting bolts. Alternatively, it can be welded or otherwise fixed in position as desired.

A lifting frame is movably supported by the bracket 16 for movement relative to bracket 16 about a hinge axis. When mounted on an implement as shown in the drawings, the hinge axis will be horizontal and transverse to the intended field direction of movement of the implement. This will result in elevational adjustment of the outer end of the frame.

The frame basically comprises an elongated tubular member 17 extending outward from the bracket 16 in a direction perpendicular to the hinge axis. The hinged connection between bracket 16 and the lifting frame is shown as a shaft 18 mounted to the bracket 16. The extended tubular member 17 is carried on shaft 18 by a pivotable hollow shaft 23 that is part of the rigid frame.

The lifting frame is completed by a pair of angular braces 19 at opposite sides of the tubular member 17. The angular braces are fixed to the outer end of the tubular member 17 and to the ends of the interconnecting hollow shaft 23.

The outer end of the lifting frame includes a wheel support bracket 21 that is fixed to the outer end of tubular member 17. The wheel support bracket 21 rotatably supports a wheel 22. The illustrated wheel 22 is arranged transverse to the intended field direction of movement of the implement. It is inoperable during field use and is utilized only when pulling the framework 10 longitudinally or parallel to its transverse length.

A movable saddle is adjustably attachable to the frame. The illustrated saddle is rigid and capable of imparting pivotable movement to the frame. It comprises a base having a channel-shaped cross-section including parallel spaced sides 24 and a connecting upper flange 25. The two sides 24 straddle the respective sides of the tubular member 17. The saddle is maintained on the tubular member 17 by a pair of removable retainer pins 26 of conventional design. When retainer pins 26 are removed, the saddle is free to be carried from one lifting frame to another. When retainer pins 26 are in place, as illustrated in the drawings, the saddle is free to move longitudinally along the length of tubular member 17. The flange 25 across the saddle base is provided with an aperture that can be selectively aligned with holes 20 formed through the tubular member 17 at its inner and outer ends. A removable pin 39 locates the saddle at either its operative inner position (FIG. 2) or its inoperative outer position (FIG. 1).

The saddle is completed by an extension 27 that is adapted to selectively overlie the bracket 16. Extension 27 is rigidly connected to the base of the saddle by an interconnecting pedestal. The extension 27 permits placement of an extendible device, such as a jack, between the bottom surface of extension 27 and the bracket 16 for pivoting the lifting frame relative to the bracket about the hinge axis in one angular direction (shown as being clockwise in FIGS. 1 and 2).

The basic accessory support is completed by one or more flexible members, shown as link chains 29, having one end anchored to the outer end of the frame by adjustable eye-bolts 30. The free end of each chain is adapted to be releasably connected to the implement framework 10 at a location elevationally offset below the hinge axis of shaft 18 to selectively limit pivotal motion of the lifting frame relative to the bracket about the hinge axis in the remaining angular direction (shown as being counterclockwise in FIGS. 1 and 2). This connection is accomplished by slotted brackets 31 adapted to be fixed to the framework 10.

Figure 2:
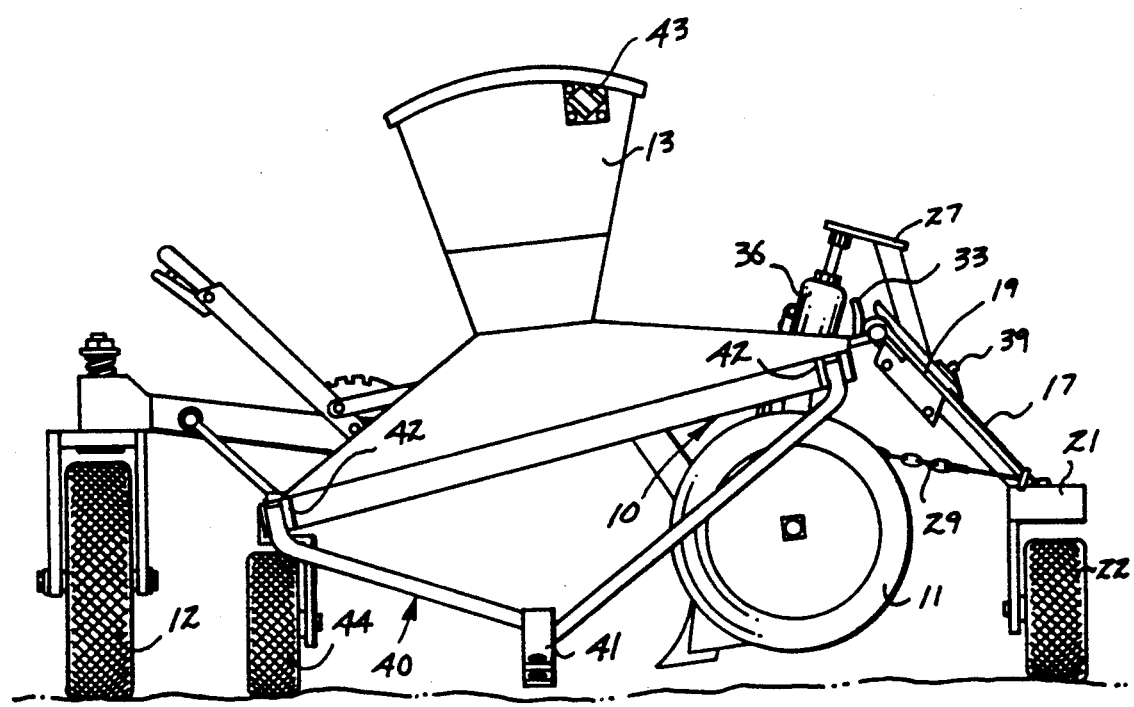
FIG. 2 is a view similar to FIG. 1, showing the travel position.

The slotted brackets 31 each include an open slot 32 whose width is complementary to the thickness of one link of the illustrated link chain 29. As shown in FIGS. 2 and 6, when the weight of the framework 10 is applied to the outwardly and downwardly extending frame, the chains 29 complete a structural triangle to rigidly prevent downward elevational movement of the framework 10 and elevationally support the tools 11 above ground level.

A rigid stop 33 is fixed to the bracket 16 in a transverse position where it will be abutted by the inner end of tubular member 17 when it has been swung upwardly to the position shown in FIG. 1. The angular position of the stop 33 locates the pivotable lifting frame in an overcenter position relative to the hitch axis to assist in preventing it from accidentally swinging downwardly.

The tubular member 17 can be selectively locked to the stop 33 by a releasable pin 35 received within aligned apertures 34 and 37 formed through the stop 33 and tubular member 17, respectively.

To raise the tools 11 from their field or working positions in soil engagement, one must first release the lifting frame from its connection to the rigid stop 33 by removing the pin 35 that interconnects them during field use of the implement. The lifting frame can then be manually swung to a position in which the wheel 22 rests on the ground.

To raise the framework 10 relative to the wheel 22, a conventional mechanical or hydraulic jack 36 can be interposed between a forwardly protruding extension 28 integral with the bracket 16. The front end of extension 28 is retained under a fixed ledge 38 attached to the framework 10 of the implement. Ledge 38 prevents the front end of the extension 28 from moving upwardly relative to the supporting framework 10 when the weight of the implement is borne by the lowered frame.

To permit the jack 36 to pivot slightly as required by movement of the frame, a base 50 is preferably bolted to its lower end. Base 50 is provided with a pair of spaced cylindrical rods 51 secured to its lower surface. The rods 51 are spaced apart by a distance less than the diameter of a larger transverse rod 52 fixed across the upper surface of bracket 16. As can be seen in FIG. 5, the interfitting rods 51 and 52 provide a limited pivotable support for the jack 36 about an axis parallel to the hinge axis.

With the jack in place, one can raise the saddle extension 27 to cause the outer end of the lifting frame and wheel 22 to pivot downwardly beyond their intended travel positions. The free ends of the chains 29 can then be fitted within the receiving slots 32 of the fixed brackets 31 on framework 10. Subsequent lowering and removal of jack 36 will cause the weight of the framework 10 to be carried by the triangular support above the wheel 22. The removed jack 36 can then be used to operate similar lifting frames on associated implements. If desired one can also remove the saddle and use it on associated implement lifting frames.

To lower the framework 10 back to a field position, one must first jack 36 between the bracket extension 28 and saddle extension 27. The jack 36 must then be extended to remove the weight of framework 10 from the link chains 29 so that their free ends can be released from the slots 32 in brackets 31. After the chains 29 have been released, the jack 36 can be retracted to shift the framework weight back to the implement tools 11. Jack 36 can then be further retracted and removed. At this point, the saddle can either be removed from the pivotable lifting frame or can be shifted longitudinally to its outer end.

The illustrated equipment also includes a hitch mounted to one transverse end of framework 10 for movement between an upright field position (FIG. 1) and a travel position (FIG. 2) projecting transversely outward from the framework. The hitch comprises a pivotable hitch frame 40 supporting a conventional outer hitch member 41 designed for attachment to a towing vehicle (not shown) or adjacent implement. The hitch frame 40 is interconnected to the side transverse frame member 15 of framework 10 by pivot brackets 42 that define a common pivot axis. A locking bracket 43 is provided at one side of the illustrated seed box 13 for receiving the hitch frame 40 within it so that it can be held by a removable pin 46 (FIG. 1).

The inner end of hitch frame 40 is also provided with an auxiliary wheel 44 carried by a pivoted support 45 that permits free movement of wheel 44 about a vertical axis when the hitch is lowered in its transport position. Wheel 44 stabilizes the resulting longitudinal hitch by supporting a small portion of the weight of the implement.

To assure that some weight is applied to wheel 44, the location of the lifting frame should be slightly to one side of the center of the implement framework 10 in the case of the first implement towed behind a pulling vehicle. In the case of successive implements pulled in a train of implements, the transverse weight across the accessory support should be substantially balanced and the provision of an auxiliary wheel 44 is unnecessary.

The illustrated lifting frame and associated hitch frame provide a very economical apparatus for effecting field and road travel of an elongated implement. It requires no dedicated hydraulic equipment and can be readily operated by a single person by using a jack of the type readily available in most agricultural environments.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. An accessory support for lifting and facilitating longitudinal road travel of an agricultural implement that has an elongated framework carrying a plurality of tools in ground-engaging positions as it is drawn transversely across a field during its normal use, the accessory support comprising:

a bracket adapted to be attached to one side of the elongated framework of an agricultural implement;

a rigid lifting frame having one end pivotally mounted to the bracket for relative movement between the lifting frame and bracket about a hinge axis;

a wheel mounted to the remaining end of the lifting frame;

a saddle adjustably attachable to the lifting frame, the saddle including an extension adapted to selectively overlie the bracket to permit placement of a portable extendable device between the extension and the bracket for pivoting the lifting frame relative to the bracket about the hinge axis in one angular direction;

fastening means releasabaly fixing the saddle to the lifting frame; and a flexible member having one end anchored to the remaining end of the lifting frame, the flexible member further having a free end adapted to be releasably connected to the elongated framework of an implement at a location elevationally offset from the hinge axis to selectively limit pivotal motion of the lifting frame relative to the bracket about the hinge axis in the remaining angular direction.

2. The accessory support of claim 1, wherein the rigid lifting frame includes an elongated tubular member extending outward from the bracket in a direction perpendicular to the hinge axis.

3. The accessory support of claim 1, wherein the rigid lifting frame includes an elongated tubular member extending outward from the bracket in a direction perpendicular to the hinge axis; and a pair of angular braces at opposite sides of the tubular member, the angular braces being fixed relative to the tubular member at the remaining end of the lifting frame and diverging from it to coaxial pivotal connections of each brace to the bracket about the hinge axis at locations spaced from the one end of the tubular member.

4. The accessory support of claim 1, wherein the rigid lifting frame includes an elongated tubular member extending outward from the bracket in a direction perpendicular to the hinge axis;

the saddle including a base including two spaced sides which straddle the tubular member to guide the saddle along the length of the tubular member.

5. The accessory support of claim 1, whereiin the rigid lifting frame includes an elongated tubular member extending outward from the bracket in a direction perpendicular to the hinge axis;

the saddle including a base complementary to the tubular member and having two spaced sides joined by a central flange, wherein the sides of the base straddle the tubular member to guide the saddle along the length of the tubular member; and removable retainer means fixed across the sides of the saddle base for engagement of the tubular member in opposition to the central flange of the base.

6. The accessory support of claim 1, wherein the flexible means comprises:

a length of link chain adapted to support the elongated framework in a triangular fashion at an elevated road travel position;

the accessory support further comprising:

a slotted bracket adapted to be fixed to the elongated framework of the implement, the slotted bracket including an open slot whose width is complementary to the thickness of one link of the chain.

7. The accessory support of claim 1, wherein the frame includes an elongated tubular member extending outward from the bracket in a direction perpendicular to the hinge axis; and further comprising:

a rigid stop fixed to the bracket in the pivotal path of the tubular member; and a releasable fastener adapted to secure the tubular member to the rigid stop.

8. The accessory support of claim 1, wherein the bracket includes an elongated extension protruding outward from it in a direction perpendicular to the hinge axis; and support means on the extension for mounting an extendable device to it.

9. In combination with an agricultural implement that has an elongated transverse framework having a ground-engaging wheel at its front side, the elongated transverse framework carrying a plurality of tools in ground-engaging positions at its rear side as it is drawn transversely across a field during its normal use:

an accessory support for lifting and facilitating longitudinal travel of the agricultural implement comprising:

a transverse bracket attached along the rear side of the elongated framework of the agricultural implement;

a rigid lifting frame having an inner and an outer end, the inner end of the lifting frame being pivotally mounted to the bracket for relative movement of the lifting frame about a transverse horizontal hinge axis between an upright field position and a downwardly extending travel position;

a wheel mounted to the outer end of the lifting frame;

a saddle adjustably attachable to the lifting frame, the saddle including an inwardly protruding extension adapted to selectively overlie the bracket to permit placement of a portable extendable device between the extension and the bracket for pivoting the rigid lifting frame relative to the bracket about the hinge axis in a downward direction;

fastening means releasably fixing the saddle to the lifting frame; and a flexible member having one end anchored to the remaining end of the lifting frame, the flexible member further having a free end adapted to be releasably connected to the elongated framework of the implement at a location elevationally offset below the hinge axis to selectively limit pivotal motion of the lifting frame relative the bracket about the hinge axis in an upward direction.

10. The combination of claim 9, wherein the rigid lifting frame includes an elongated tubular member extending outward from the bracket in a direction perpendicular to the hinge axis.

11. The combination of claim 9, wherein the rigid lifting frame includes an elongated tubular member extending outward from the bracket in a direction perpendicular to the hinge axis; and a pair of angular braces at opposite sides of the tubular member, the angular braces being fixed relative to the tubular member at the outer end of the lifting frame and diverging from it to coaxial pivotal connections of each brace to the bracket about the hinge axis at locations spaced from the inner end of the tubular member.

12. The combination of claim 9, wherein the rigid lifting frame includes an elongated tubular member extending outward from the bracket in a direction perpendicular to the hinge axis;

the saddle including a base including two spaced sides which straddle the tubular member to guide the saddle along the length of the tubular member.

13. The combination of claim 9, wherein the rigid lifting frame includes an elongated tubular member extending outward from the bracket in a direction perpendicular to the hinge axis;

the saddle including a base complementary to the tubular member and having two spaced sides joined by a central flange, wherein the sides of the base straddle the tubular member to guide the saddle along the length of the tubular member; and removable retainer means fixed across the sides of the saddle base for engagement of the tubular member in opposition to the central flange of the base.

14. The combination of claim 9, wherein the flexible means comprises a length of link chain; and further comprising:

a slotted bracket fixed to the framework of the implement, the slotted bracket including an open slot whose width is complementary to the thickness of one link of the chain.

15. The combination of claim 9, wherein the rigid lifting frame includes an elongated tubular member extending in a direction perpendicular to the hinge axis; and further comprising:

a rigid stop fixed to the bracket in the pivotal path of the tubular member; and a releasable fastener adapted to secure the tubular member to the rigid stop.

16. The combination of claim 9, wherein the bracket includes an elongated horizontal extension protruding in a direction perpendicular to the hinge axis; and support means on the extension for mounting an extendable device to it.

17. The combination of claim 9, further comprising:

foldable hitch means mounted to one transverse end of the framework of the implement for movement between an upright field position and a travel position projecting transversely outward from the framework.

* * * * *